US011972665B2

(12) United States Patent
Colceri

(10) Patent No.: US 11,972,665 B2
(45) Date of Patent: Apr. 30, 2024

(54) EVENT-BASED GAMING SYSTEMS AND METHODS

(71) Applicant: John Colceri, Pasadena, CA (US)

(72) Inventor: John Colceri, Pasadena, CA (US)

(73) Assignee: SMET Ventures, LLC, Temecula, CA (US)

( * ) Notice: Subject to any disclaimer, the term of this patent is extended or adjusted under 35 U.S.C. 154(b) by 0 days.

(21) Appl. No.: 17/705,499

(22) Filed: Mar. 28, 2022

(65) Prior Publication Data

US 2023/0048171 A1 Feb. 16, 2023

Related U.S. Application Data

(63) Continuation of application No. 16/526,584, filed on Jul. 30, 2019, now Pat. No. 11,288,924, which is a continuation of application No. 15/941,480, filed on Mar. 30, 2018, now abandoned, which is a continuation of application No. 14/506,850, filed on Oct. 6, 2014, now Pat. No. 9,953,489, which is a continuation of application No. 13/451,833, filed on Apr. 20, 2012, now Pat. No. 8,876,584.

(60) Provisional application No. 61/477,716, filed on Apr. 21, 2011.

(51) Int. Cl.
*G07F 17/32* (2006.01)

(52) U.S. Cl.
CPC ........ *G07F 17/326* (2013.01); *G07F 17/3288* (2013.01)

(58) Field of Classification Search
CPC ............ A63F 2300/69; A63F 2003/088; A63F 13/10; A63F 2300/407; G07F 17/32; G07F 17/3288; G07F 17/3244; G07F 17/3223; G07F 17/326; G07F 17/3262
See application file for complete search history.

(56) References Cited

U.S. PATENT DOCUMENTS 6,193,605 B1 * 2/2001 Libby ................ G07F 17/3262 463/40
2004/0266513 A1 * 12/2004 Odom .................... G06Q 50/34 463/17
2005/0130725 A1 * 6/2005 Creamer ................ A63F 13/63 463/1
2005/0233794 A1 * 10/2005 Cannon .............. G07F 17/3267 463/16
(Continued)

*Primary Examiner* — Steve Rowland
(74) *Attorney, Agent, or Firm* — Weide & Miller, Ltd.

(57) ABSTRACT

A method of playing a game, the method comprising selecting a predefined number of player indicia; providing an event reference, the event reference being viewable on a display device, the event reference comprising a plurality of event participants, the plurality of event participants being ranked; randomly generating a plurality of randomly generated indicia, the plurality of randomly generated indicia comprising a first indicia and a second indicia; associating the first indicia with a first event participant; associating the second indicia with a second event participant; obtaining the ranking of the participants based on the order they finish in the event reference; ordering the plurality of randomly generated indicia based on the ranking of their respective associated participants; and determining a game outcome, the game outcome comprising comparing the player indicia to the plurality of randomly generated indicia.

9 Claims, 8 Drawing Sheets

(56) References Cited

U.S. PATENT DOCUMENTS

| | | | | |
|---|---|---|---|---|
| 2005/0288081 | A1* | 12/2005 | Amaitis | G07F 17/3288 463/6 |
| 2006/0009280 | A1* | 1/2006 | Joshi | G07F 17/3244 463/25 |
| 2007/0087804 | A1* | 4/2007 | Knowles | G07F 17/3288 463/43 |
| 2007/0184892 | A1* | 8/2007 | Asher | G07F 17/32 463/20 |
| 2009/0191930 | A1* | 7/2009 | Lutnick | G07F 17/32 463/6 |
| 2012/0295685 | A1* | 11/2012 | Odom | G07C 15/006 463/17 |

* cited by examiner

EVENT-BASED GAMING SYSTEMS AND METHODS

RELATED APPLICATION DATA

This application is a continuation of U.S. patent application Ser. No. 16/526,584, filed Jul. 30, 2019, which is a continuation of U.S. patent application Ser. No. 15/941,480, filed Mar. 30, 2018 (now abandoned), which is a continuation of U.S. patent application Ser. No. 14/506,850, filed Oct. 6, 2014, now U.S. Pat. No. 9,953,489, issued Apr. 24, 2018, which is a continuation of U.S. patent application Ser. No. 13/451,833, filed Apr. 20, 2012, now U.S. Pat. No. 8,876,584, issued Nov. 4, 2014, which claims the benefit of U.S. Provisional Patent Application Ser. No. 61/477,716, filed on Apr. 21, 2011, the disclosures of which are hereby incorporated by referenced in their entirety.

FIELD OF THE INVENTION

The present invention relates to games of chance, and in particular, games of chance that base their outcomes on, among other things, the combination of chance with the participants' performances.

BACKGROUND OF THE INVENTION

Sports betting, lottery, and casino games are some of the most popular games where people place bets or wager. They may also be legal in many states generally due to the randomness of their outcomes and due to the fact that their outcomes may not be dependent on the players' skills. Players have been wagering on the same events over and over and for many, many years, including horse racing, boxing, and basketball. Some players, game establishments, and game providers desire a refreshing change in the kinds of events they can place wagers on.

Many people are big fans of popular events, such as game shows like the AMERICAN IDOL®, beauty pageants like THE MISS AMERICA PAGEANT® or MISS UNIVERSE®, annual celebrity awards like the OSCARS® or the GRAMMYS®, and sporting events like the OLYMPIC®, NASCAR®, or the MASTERS® in golf. The inventor in the present application has found systems and methods that can turn these events into wagering opportunities. The inventor's systems and methods bring about a much awaited change in the scenery of wagering games, which can potentially bring about a great amount of excitement in the gaming industry. The inventor's systems and methods can also potentially bring new players, particularly the fans of the above mentioned events, into gaming facilities.

SUMMARY OF THE INVENTION

The present invention includes a method of playing a game, the method comprising selecting a predefined number of player indicia; providing an event reference, the event reference being viewable on a display device, the event reference comprising a plurality of event participants, the plurality of event participants being ranked; randomly generating a plurality of randomly generated indicia, the plurality of randomly generated indicia comprising a first indicia and a second indicia; associating the first indicia with a first event participant; associating the second indicia with a second event participant; obtaining the ranking of the participants based on the order they finish in the event reference; ordering the plurality of randomly generated indicia based on the ranking of their respective associated participants; and determining a game outcome, the game outcome comprising comparing the player indicia to the plurality of randomly generated indicia.

The above description sets forth, rather broadly, a summary of embodiments of the present invention so that the detailed description that follows may be better understood and contributions of the present invention to the art may be better appreciated. Some of the embodiments of the present invention may not include all of the features or characteristics listed in the above summary. There may be, of course, other features of the invention that will be described below and may form the subject matter of claims. In this respect, before explaining at least one embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways.

DETAILED DESCRIPTION OF THE INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention. Also, it is to be understood that the phraseology and terminology employed herein are for the purpose of description and should not be regarded as limiting. When explaining the flowcharts and the exemplary methods of the present invention, the order in which the steps are presented is not limited to any particular order and does not necessarily imply that they have to be performed in the order presented. It will be understood by those of ordinary skill in the art that the order of these steps can be rearranged and performed in any suitable manner It will further be understood by those of ordinary skill in the art that some steps may be omitted or added and still fall within the spirit of the invention.

Figure 1:
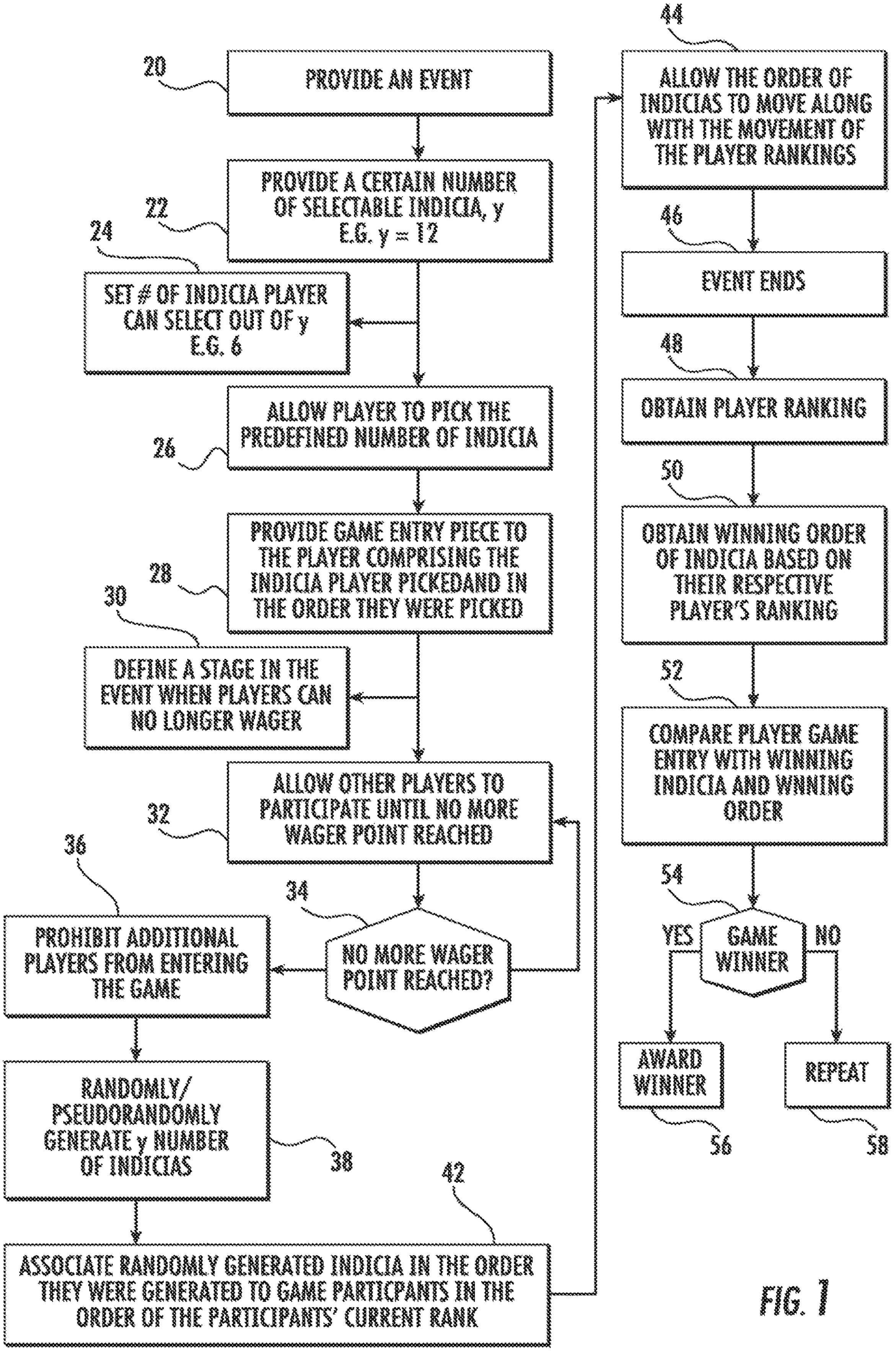
FIG. 1 is substantially a flowchart of an exemplary gaming method of the present invention.

The present invention provides various embodiments of playing a game of chance wherein players may place a wager on an event and win a prize depending on the outcome. The outcome may be based on the comparison between the indicia the players selected or the system selected for the players (also referred to as "player indicia"), the sequence of the player indicia, the randomly generated indicia, and the order or sequence of the randomly generated indicia, which may be dependent on how participants in the event finish. Referring to FIG. 1, an exemplary embodiment of a game of chance of the present invention preferably starts by providing an event (step 20). The event may not necessarily be hosted by the person or entity implementing the present invention and may simply be an organized event by any third party, and thus may be referred to as an event reference. The event may be any event where participants finish in a ranked order. The range of the diversity of the events may be broad, such as from singing competitions to beauty pageants to various games played at the Olympics. Examples of events include, without limitation: the singing contest and game show AMERICAN IDOL®, the reality shows SURVIVOR®, DANCING WITH THE STARS®, and THE BACHELOR®, annual celebrity awards, such as the GRAMMYS® and the OSCARS®, beauty pageants, such as THE MISS AMERICA PAGEANT® and MISS UNIVERSE®, NASCAR® racing competition, horse racing, golf, the WIMBLEDON® tennis competition, the World Cup soccer competition, the Grand Prix racing competition, and popular sports including baseball, basketball, football, hockey, and the like.

Once an event is provided, a certain number of selectable indicia, y, is preferably determined (step 22), such as 12. The indicia can be in the form of numbers, alphabets, symbols, characters, and other indicia known in the art. Next, at step 24, the number of indicia, x, out of y indicia that players may select or that the system may select for the players is preferably set, such as 6 out of the 12 indicia. At step 26, a player or the system may be allowed to select the predefined number of indicia, x. As an example, if x is six, the player or the system may select six numbers, such as 4, 8, 3, 6, 2, and 1. A game entry piece may then be provided to the player, such as a ticket (step 28). The game entry piece preferably includes a listing of the indicia the player or the system selected. The indicia are preferably listed in the order they were selected.

Next, a stage or a point in the event when players will no longer be allowed to wager is defined (step 30) (hereinafter the "No More Wager" point). This may be, as examples: when there are three laps to go in a NASCAR® race; when there are twelve contestants left in AMERICAN IDOL®; or, the start of the final round in golf It can be realized that, depending on the event, it may take several hours, days, weeks, or months for the No More Wager point to be reached. This can mean that there is quite a bit of flexibility in generating a pool of money with certain embodiments of the present invention. A relatively long period of time from the time bets are collected to the No More Wager point may be set if a large betting pool is desired. Alternatively, a relatively short period of time may be set if a small betting pool is desired. Certain embodiments may utilize pari-mutuel betting scheme wherein the bets are placed together in a pool, the house take is removed, and the pool is shared among all winning bets. The payoff odds may be calculated by sharing the pool among all winning bets.

When the No More Wager point is reached (step 34), additional players are preferably prohibited from participating in the game (step 36). A random or pseudo random indicia generator (hereinafter "RIG"), as further discussed below, preferably generates all of the y number of indicia (step 38). For instance, if y is set at 12 in step 22, the RIG preferably generates 12 indicia. Next, each of the randomly or pseudo-randomly selected indicia is preferably associated with the game participants (step 40). The order in which the indicia were randomly generated is preferably associated with the participants in the order the participants rank at the No More Wager point. Thus, the first randomly generated indicia is preferably associated with the participant in the first place at the No More Wager point; the second randomly generated indicia is preferably associated with the participant in the second place at the No More Wager point, and so on. As a specific example, in a NASCAR® racing event where y equals 12, suppose the RIG generates 3, 2, 4, 5, 8, 6, 10, 1, 7, 12, 9, and 11. The following table shows how the participants' rankings at the No More Wager point are considered and how they are assigned with the indicia generated by the RIG.

TABLE I

| Rank | Participant | Assigned Indicia |
|---|---|---|
| Rank 1 | Participant G | 3 |
| Rank 2 | Participant H | 2 |
| Rank 3 | Participant I | 4 |
| Rank 4 | Participant A | 5 |
| Rank 5 | Participant B | 8 |
| Rank 6 | Participant C | 6 |
| Rank 7 | Participant Z | 10 |
| Rank 8 | Participant Q | 1 |
| Rank 9 | Participant Y | 7 |
| Rank 10 | Participant D | 12 |
| Rank 11 | Participant H | 9 |
| Rank 12 | Participant M | 11 |

At step 44, since the game is based on a dynamic event where the participants' rankings likely change, each of the indicia preferably remain with the participant they were associated with and the order of the indicia preferably changes as the participants' rankings change. Various factors can lead to changes in the participants' rankings, such as the participants' performances, crashes or accidents in a NASCAR® race, player injury in a golf tournament, or a contestant disqualification in MISS UNIVERSE® or AMERICAN IDOL®. Thus, suppose, sometime during the event, participants A and Z moved to the first and second place, respectively, and participants B, G, and H fell in rankings. The following table shows how the assigned indicia stays with the participants even when the participants move up or down in the rankings

TABLE II

| Rank | Participant | Assigned Indicia |
|---|---|---|
| Rank 1 | Participant A | 5 |
| Rank 2 | Participant Z | 10 |

TABLE II-continued

| Rank | Participant | Assigned Indicia |
|---|---|---|
| Rank 3 | Participant I | 4 |
| Rank 4 | Participant G | 3 |
| Rank 5 | Participant H | 2 |
| Rank 6 | Participant C | 6 |
| Rank 7 | Participant B | 8 |
| Rank 8 | Participant Q | 1 |
| Rank 9 | Participant Y | 7 |
| Rank 10 | Participant D | 12 |
| Rank 11 | Participant H | 9 |
| Rank 12 | Participant M | 11 |

Next, the event preferably ends (step 46) and the final player rankings are preferably obtained (step 48). The winning order of indicia is preferably determined based on the ranking of the participants and the indicia associated to each of them (step 50). For instance, if the ranking of the participants in Table II did not change by the time the event ended, the winning order of indicia is 5, 10, 4, 3, 2, 6, 8, 1, 7, 12, 9, and 11. The game entry of the players, which may have been selected by the player or by the system for the player, may then be compared with the winning indicia and the winning order of indicia (step 52). In the example above, the game entry of one of the players is 4, 8, 3, 6, 2, and 1. The system preferably determines whether the player won (step 54), which in this case, the player did not win. The game preferably ends (step 58). If the system determines the player won, the player is preferably awarded (step 56).

It is noted that there may be situations where there may be no winners in which case the betting pool may be carried over to a rematch of the same event or a completely different event. These situations can happen, for instance, when a participant that did not have a randomly generated indicia associated with it (e.g., a participant outside of the first 12 spots) comes out of nowhere and gains a highly ranking place at the finish (e.g., third place). Another example is when a highly ranked participant (e.g., a participant in the fifth place) gets disqualified and is replaced by a participant that did not have a randomly generated indicia associated with it (e.g., a participant in the 14th place). It can be appreciated that these situations may further bring excitement as the betting pool may substantially increase and players may be given another shot at winning.

Figure 2:
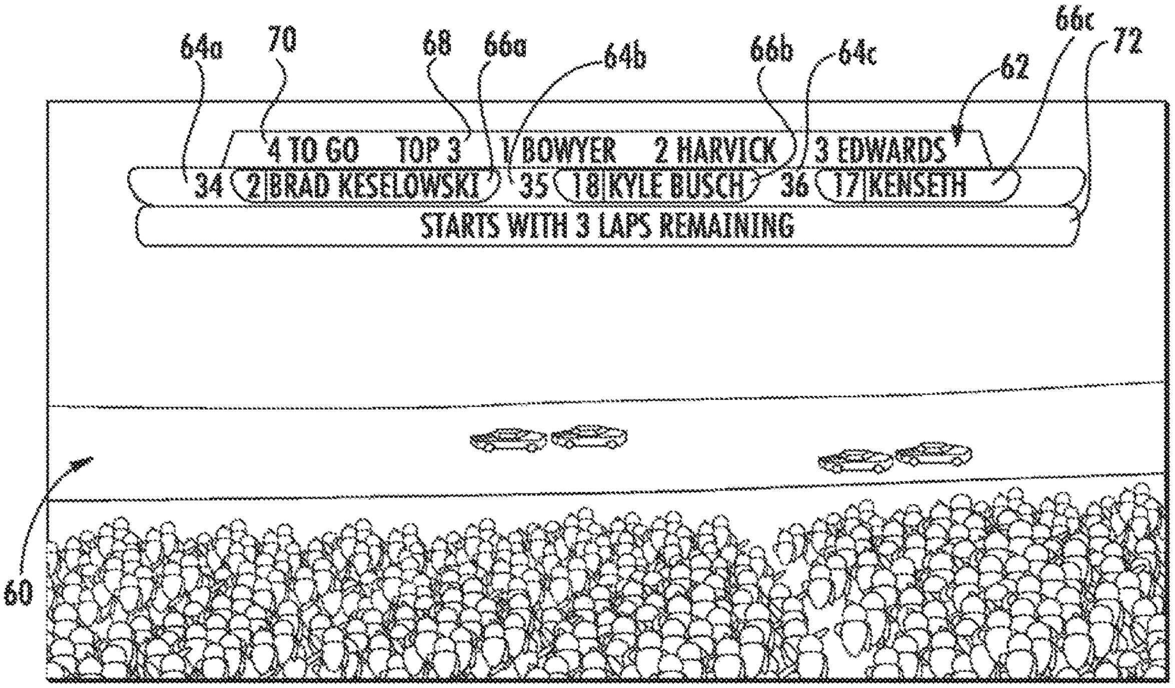
FIG. 2 is substantially a screen shot of a popular racing event combined with an embodiment of the event-based gaming system and method of the present invention.

Referring now to FIG. 2, an embodiment of the present invention is shown wherein the event reference is a car racing event, such as a NASCAR® race. It is noted that the event reference provided to the players may either be a live event or a pre-recorded event wherein the players do not know of the outcome of the event. The race is preferably displayed on a display device 60, such as a television screen, computer monitor, projector screen, a mobile device screen, or other existing display devices known in the art. A participant status area 62 on the display device 60 preferably shows the current rankings 64*a-c* of the participants' 66*a-c*. The participant status area 62 may also show the top three participants 68 and the number of laps 70 remaining in the event. The participant status area 62 may further display a wagering game status indicator 72.

Figure 3:
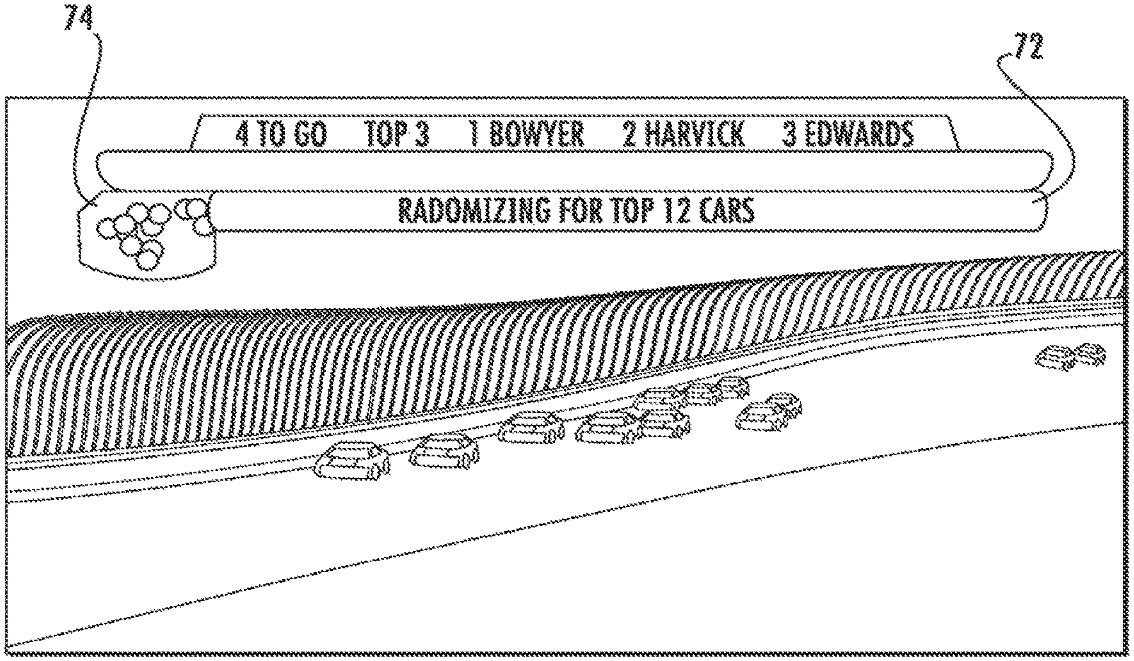
FIG. 3 is substantially a screen shot of the popular racing event of FIG. 2 showing a stage where random or pseudo random indicia are being generated.

In FIG. 2, the wagering game status indicator 72 preferably notifies the viewers that the game "starts with 3 laps remaining." This phrase preferably means that, in 3 laps, the RIG will start selecting indicia and assigning them to the participants in the order they rank at that point (as explained above in step 42). In FIG. 3, the wagering game status indicator 72 preferably notifies the viewers that the system is "randomizing for top 12 cars," which preferably means that the RIG is starting to generate random indicia. A representation 74 of the indicia being randomly generated, such as a set of keno or lottery balls being jumbled 76 and with numbers thereon, may be provided.

Figure 4:
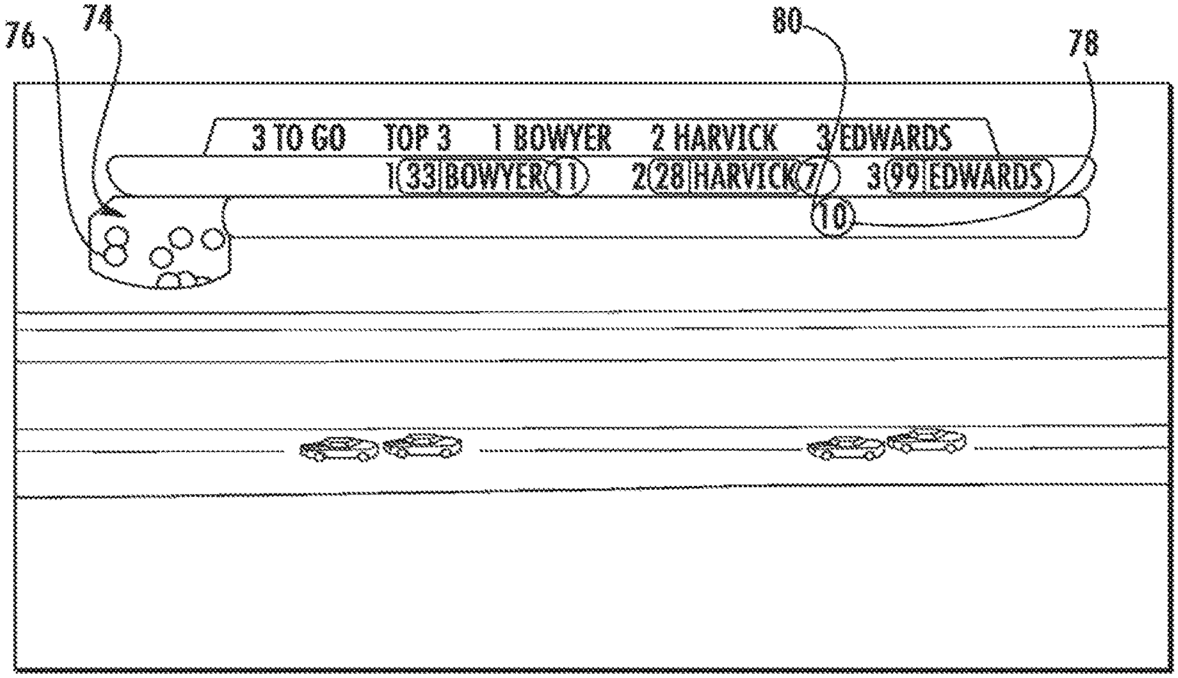
FIG. 4 is substantially a screen shot of the popular racing event of FIG. 2 showing a stage where an indicia is generated and assigned to a participant.

In FIG. 4, a representation of a ball being randomly picked 78 and coming out of the group of jumbled balls 76 is preferably provided. The ball 78 preferably shows the indicia 80 randomly generated by the RIG. Each randomly generated indicia is preferably assigned to a participant according to the order of the participants and the order of the indicia generation. To illustrate, the first randomly generated indicia is preferably assigned to the participant currently in first place. The second randomly generated indicia is preferably assigned to the participant currently in second place, and so on. As shown in FIG. 4, the first randomly generated indicia is 11, which is assigned to the car in the first place, car number 33. The second randomly generated indicia is 7, and is preferably assigned to the car in the second place, car number 28. The third randomly generated indicia is 10, which will preferably be assigned to the car in the third place, car number 99.

Figure 5:
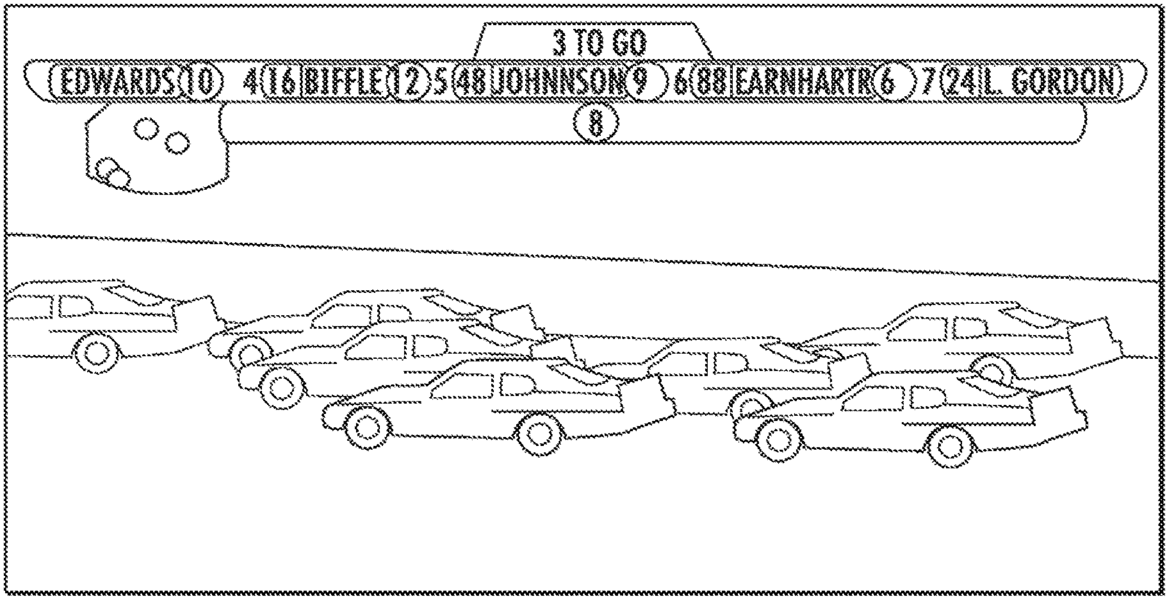
FIG. 5 is substantially a screen shot of the popular racing event of FIG. 2 showing a stage where the order of indicia changes with the order of the rankings of the participants.

The RIG preferably continues to randomly generate indicia until all the predetermined number of indicia, y, as explained above in step 22, are generated. FIGS. 5-8 show how the order of the randomly generated indicia changes as the ranking of each of the participants' changes. As shown in FIG. 5, at the point where there are three laps to go in the race, indicia 10 is assigned to the car in the third place, car number 99; indicia 12 is assigned to the car in the fourth place, car number 16; indicia 9 is assigned to the car in the fifth place, car number 48; indicia 6 is assigned to the car in the sixth place, car number 88; indicia 8 will be assigned to the car in the seventh place, car 24.

Figure 6:
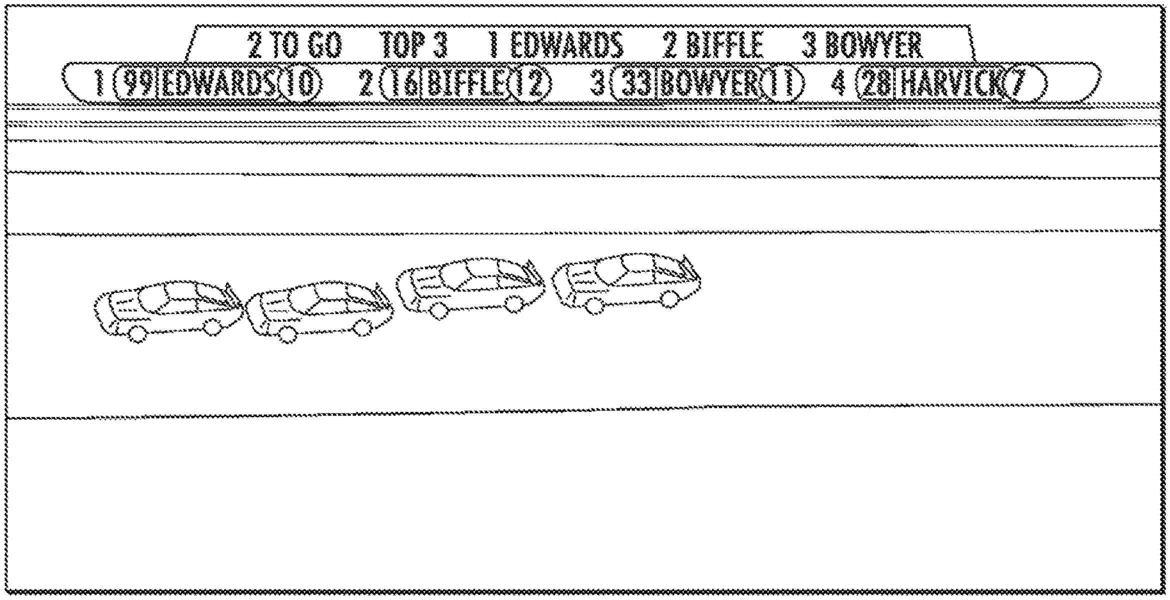
FIG. 6 is substantially another screen shot showing the order of indicia changing with the order of the rankings of the participants.

Referring now to FIG. 6, where there are two laps to go in the race, the car that used to be in the third-place, car 99, is now in the first place. Indicia 10 remains with the car it originally was assigned to even if the car moves in ranking. Car number 16 moves from fourth place to second-place. The indicia that was assigned to car number 16, which is 12, remains with it as it moves to second place. The car that used to be in the first place, car number 33, moved down to the third-place. Its indicia, indicia 11, moves along with car number 33, as it moves down in ranking. The car that used to be in the second-place, car number 28, moved down to the fourth place and so did its indicia, 7.

Figure 7:
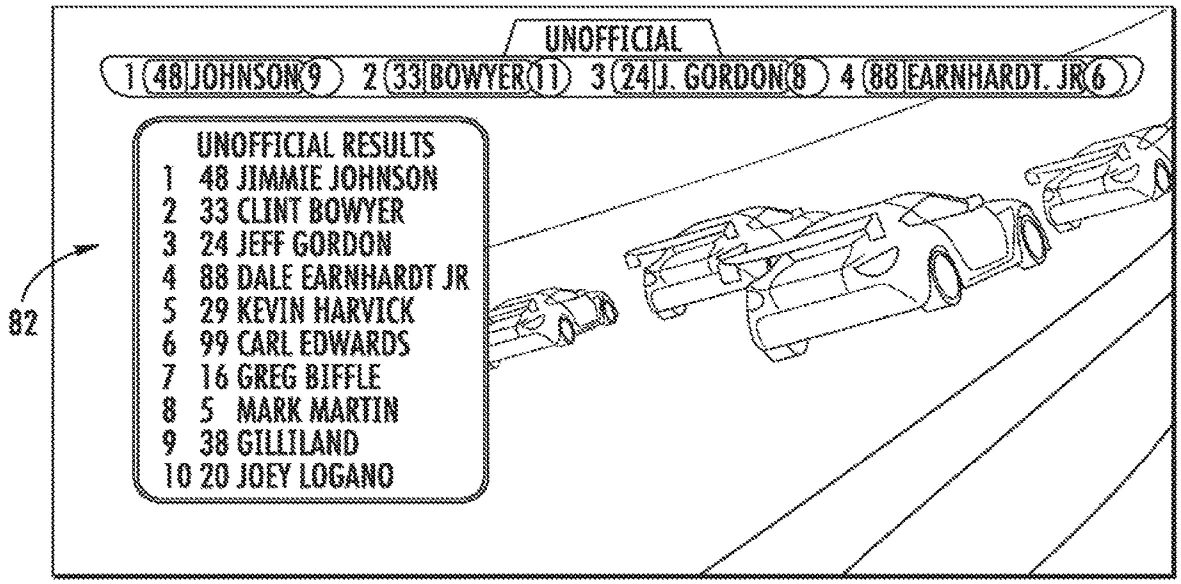
FIG. 7 is substantially a screen shot of the popular racing event of FIG. 2 wherein the participants have reached the finish line.
Figure 8:
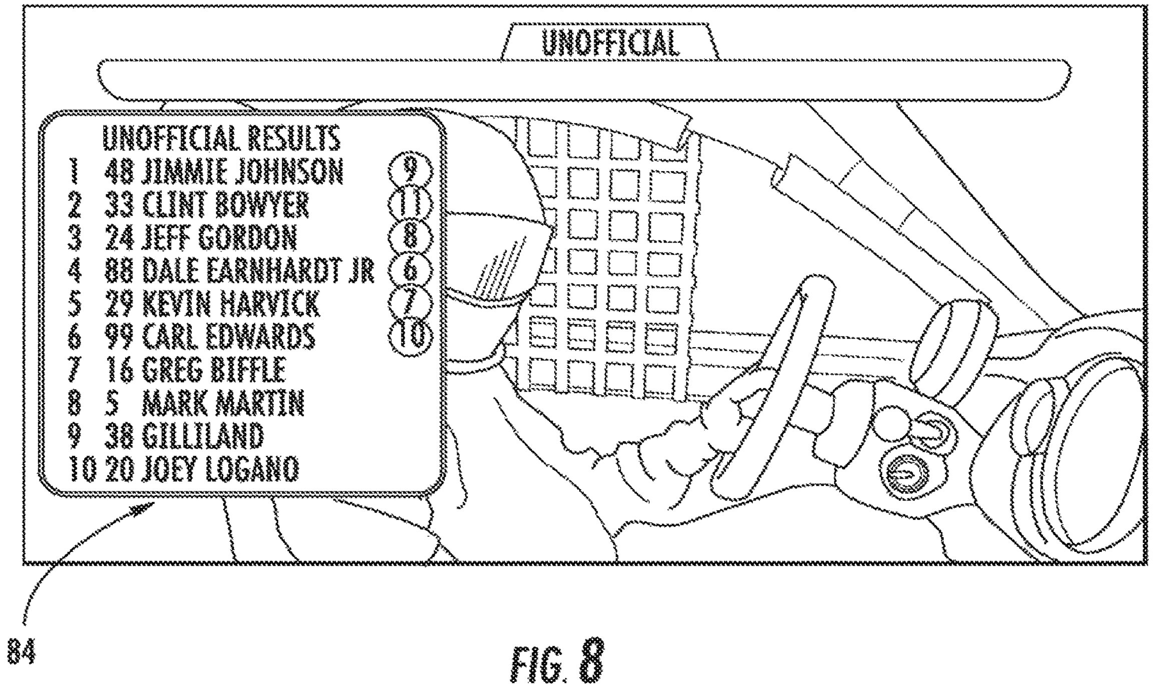
FIG. 8 is substantially a screen shot of the popular racing event of FIG. 2 showing the winning set of indicia and the winning order.
Figure 9:
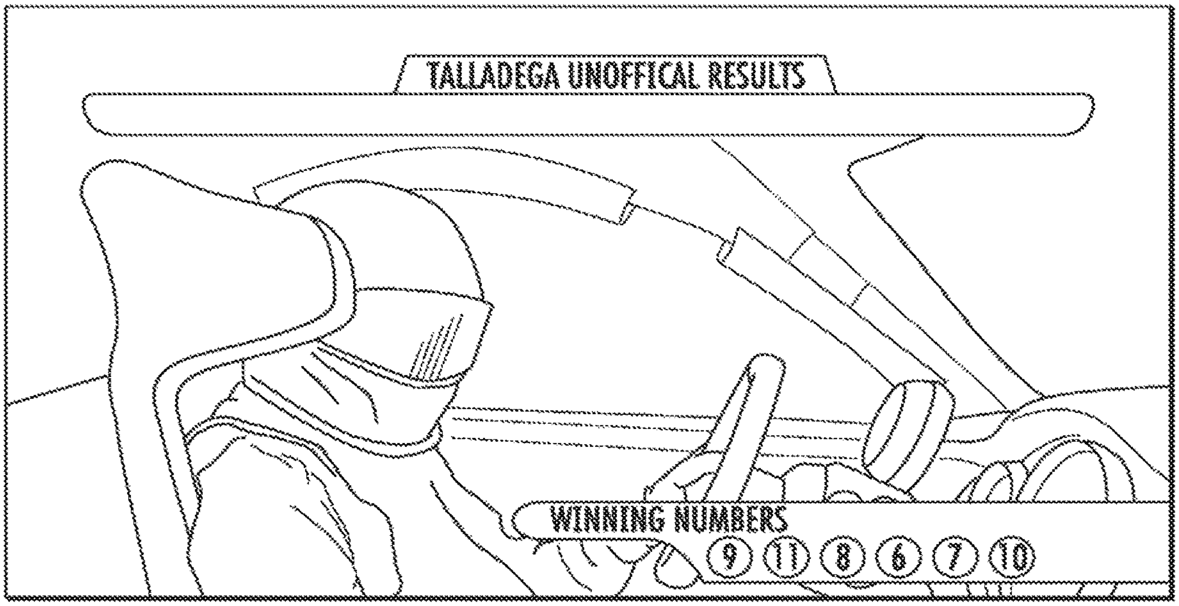
FIG. 9 is substantially a screen shot of the popular racing event of FIG. 2 with another display of the winning set of indicia and the winning order.

Referring now to FIG. 7, the participants reach the finish line in the race and the unofficial results are shown. The order of the indicia is shown to have changed along with the ranking of the participants they were associated with. As the participants moved up or down in rankings, the indicia moved along with the participants they were associated with. A list of the results 82 is preferably displayed. Another version of the list of the results 84 is shown in FIG. 8 wherein the associated indicia of each of the winning participants are shown next to them. Referring now to FIG. 9, the winning order of the indicia 86 is preferably displayed without the racing participants associated with the indicia so that viewers can easily determine whether they won any prize.

System Architecture

Figure 10:
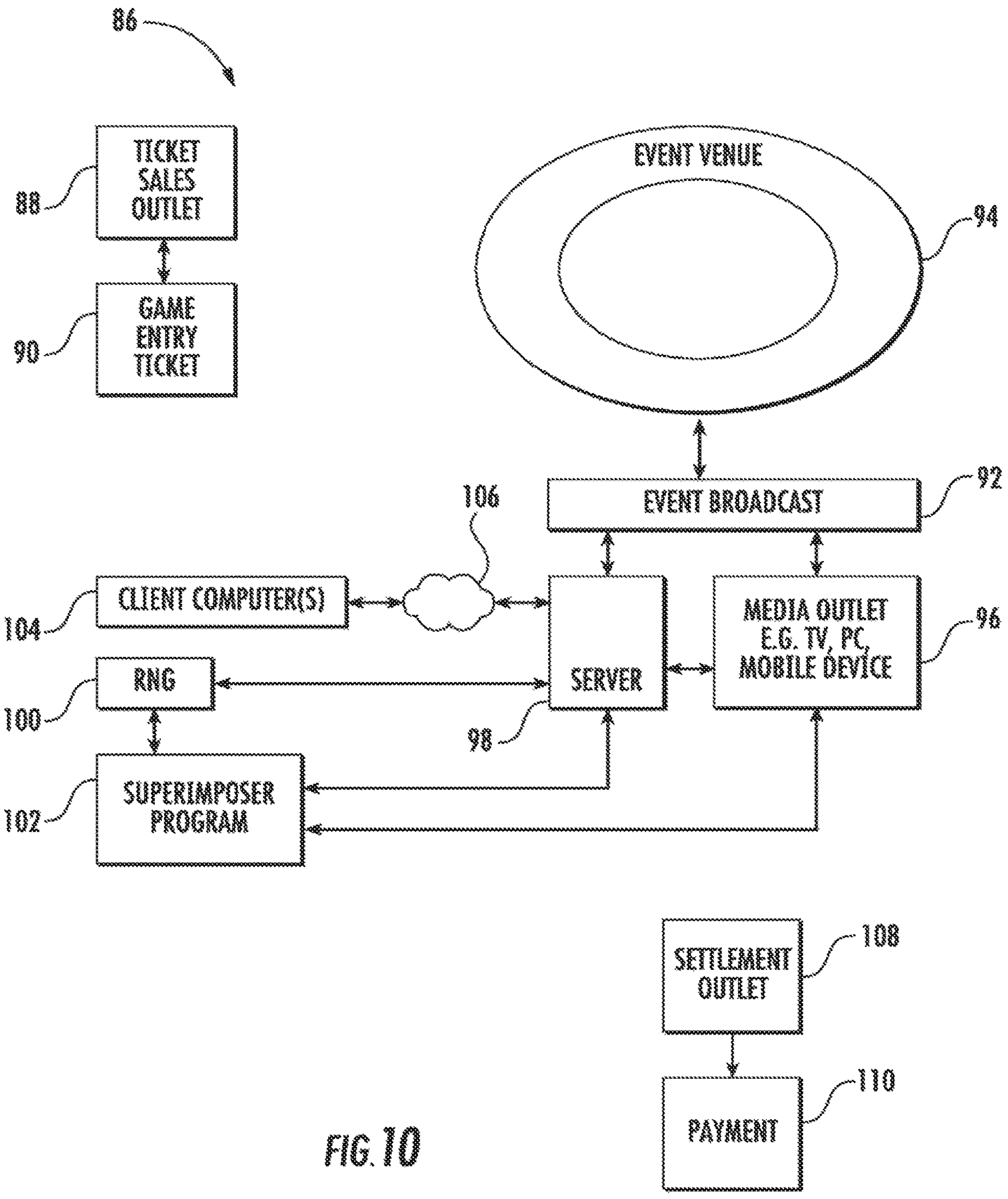
FIG. 10 is substantially an exemplary gaming system of the present invention.

Referring now to FIG. 10, an exemplary system 86 of the present invention is shown. The exemplary system 86 may include a ticket sales outlet 88 where the players may input their selected indicia or where they may obtain a set of player indicia selected for them by the system. The game entry tickets 90 may also be generated at the ticket sales outlet 88. Ticket sales outlet 88 may be in a form of a brick and mortar facility, a facility similar to a sports-betting facility, an online e-commerce site that may accept electronic payments, or other ticket sales outlet forms known in the art. The e-commerce site may be in a form of a mobile application or a website. The game entry ticket 90 preferably shows the game rules, a description of the prizes, the cost of the ticket, and the indicia listed in the order selected by the player or a machine.

The system 86 preferably also includes a broadcast of an event 92 that feeds from the footage taken from the event venue 94. The event broadcast 92 may be uploaded to a server computer 98. Alternatively, the event broadcast 92 may be transmitted to a media outlet 96 such as a television, radio, a mobile device, or a computer. The system 86 preferably also includes a random indicia generator or RIG 100. RIG 100 may be devices, such as computers, that employ computational methods for random indicia generation. RIG 100 is preferably designed to generate a sequence of numbers, symbols, or indicia that appear random or lack any pattern. RIG 100 may be similar to those used for slot machines. In an alternative embodiment (not shown), physical methods for generating random indicia may be used in lieu of RIG 100. For instance, random indicia may be generated by pulling indicia out of a hopper, dropping a keno or a bingo ball, dice, roulette wheels, playing cards, coin flipping, and the like. It is noted that RIG 100 may generate truly random indicia or pseudorandom indicia.

A superimposer program 102 may also be provided. The superimposer program 102 may reside in the server 98 or it may reside in a standalone computer. The superimposer program 102 is preferably configured to superimpose, attach, match, or associate the indicia generated by RIG 100 to the event participants displayed on the media outlet 96 or transmitted as a website by the server 98. The website may be accessible to client computers 104 via a network 106. Client computers 104 may include web browsers to access the website and system applications, such as the superimposer program 102, from the server 98. Client computers 104 may be any forms of computers that can process information and may include desktop computers, laptops, tablet computers, and mobile devices.

The exemplary system 86 may also include a settlement outlet 108 where winning outcomes may be determined and prize payments 110 may be made. At the settlement outlet 108, the game entry tickets 90 may be presented and the player indicia may be compared with the winning order of indicia. The settlement outlet 108 may again be a conventional brick and mortar facility or an e-commerce site that may pay the winners electronically.

Figure 11:
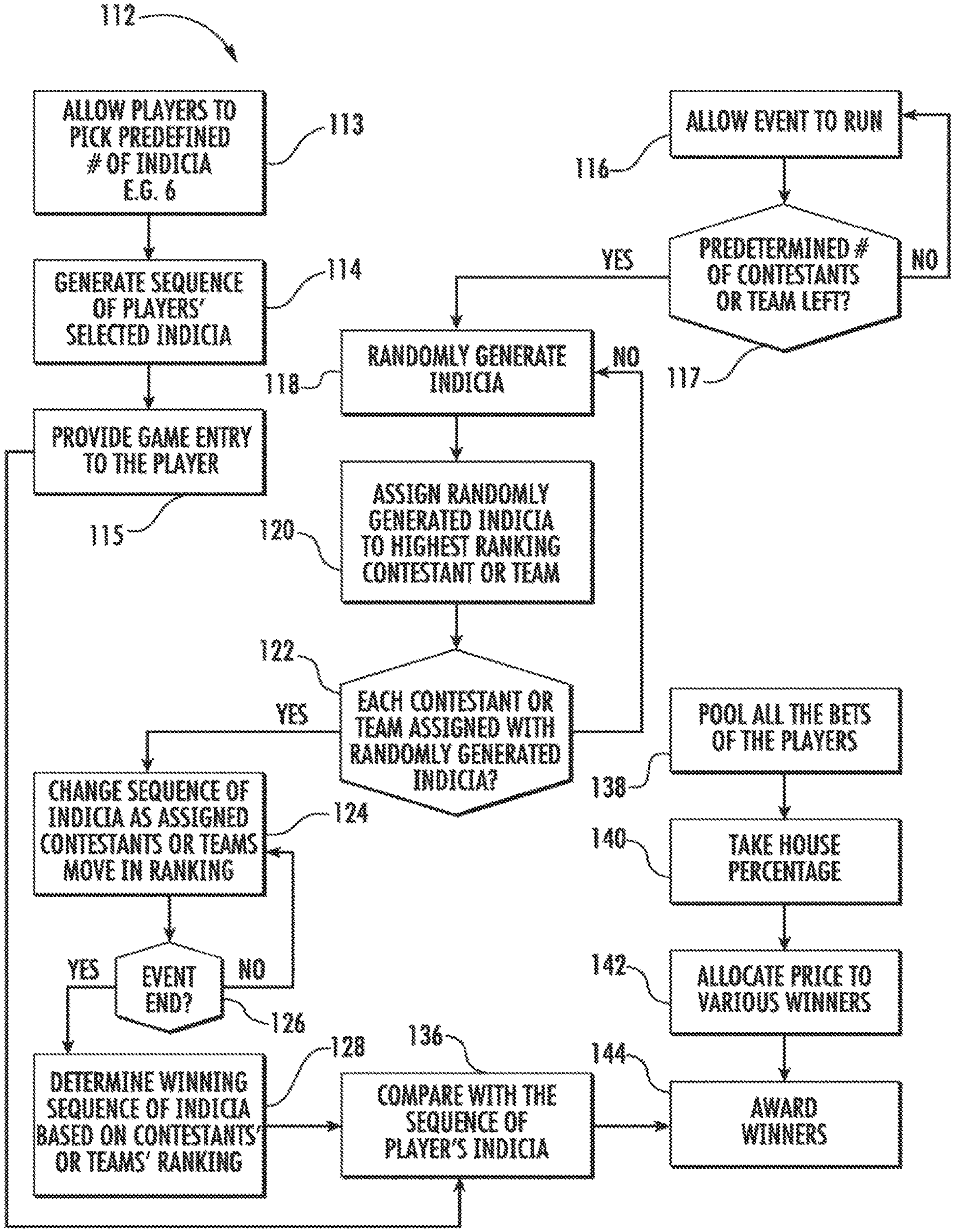
FIG. 11 is substantially a flow chart of another exemplary gaming method of the present invention.

Referring now to the flowchart 112 shown in FIG. 11, another exemplary gaming method is shown wherein at step 113, a game player may be allowed to pick a predefined number of indicia. A sequence of the players' selected indicia may be generated based on the order in which the indicia were selected by the player. At step 115, a game entry, such as ticket, may be provided to the players. It is noted that in other embodiments (not shown), the indicia may randomly be picked by a machine, such as an RIG, for the player.

Next, at step 116, an event reference is preferably allowed to run. The term "event reference" is used to refer to a real time or pre-recorded event, such as the events described above, which serves as a basis for generating a game outcome as described. At step 117, the method preferably determines whether the predetermined number of contestants or teams are left. For instance, if the event is a singing contest similar to AMERICAN IDOL® or if the event is a beauty pageant, the predetermined number may be 12 contestants. If the event is college basketball, the predetermined number may be 16 or 4. Once the predetermined number of contestants or teams is left, random indicia are preferably generated (step 118). Each time a random indicia is generated, the random indicia is preferably assigned to the highest ranking contestant or team (step 120).

Next, the system may check whether each contestant or team within the predetermined number has been assigned with the randomly generated indicia (step 122). If yes, the sequence of the indicia may be changed, as the contestants or teams the indicia are assigned to move in rankings (step 124). The event reference may be continued up to the end (step 126). Once the event reference ends, the winning sequence of indicia may be obtained based on the rankings of the contestants or teams they were associated with (step 128).

At step 136, the winning sequence of indicia is preferably compared with the sequence of player's indicia 136. If the player is determined to be a winner, the player is preferably awarded with a prize (step 137). Various ways of winning may be predefined. For instance, if the first indicia by picked by the player matches the indicia assigned to the first place winner or participant, the player may win a prize. Another way of winning is if all the indicia picked by the player or system matches the indicia assigned to a predefined number of participants. For instance, if the player is allowed to pick 6 indicia, and the predefined number of participants is 6, the indicia assigned to the top 6 participants may be compared with the player's indicia. If they all match regardless of their sequence, the player wins. Yet another winning way may be if the sequence of the player's indicia matches the sequence of the participants' indicia.

The gaming method may include pooling all the bets of all the players (step 138). The house percentage may be deducted from the pool (step 140). If there are various winning ways and winners, the net pool of bets may be allocated to various winners (step 142). The winners may then be awarded (step 137).

It can now be realized that certain embodiments of the present invention provide systems and methods that can turn popular events into wagering opportunities. Certain embodiments provide the opportunity for players to wager on these events at off track facilities and without actually being present at the event. Certain embodiments provide the opportunity for players to wager while the event is in progress, which may increase excitement as the players will likely be wagering on participants that are doing well in the event and have a decent chance of winning the event. Certain embodiments of the present invention bring about a much awaited change in the scenery of wagering games, which can potentially bring about a great amount of excitement in the gaming industry. Certain embodiments of the present invention can also potentially bring new players, particularly the fans of popular events, into gaming facilities.

Although the description above contains many specifications, these should not be construed as limiting the scope of the invention but as merely providing illustrations of some of the presently preferred embodiments of this invention. For example, the order in which the steps are presented in the flowcharts is not limited to any particular order and does not necessarily imply that they have to be performed in the order presented. It will be understood by those of ordinary skill in the art that the order of these steps can be rearranged and performed in any suitable manner. It will further be understood by those of ordinary skill in the art that some steps may be omitted or added and still fall within the spirit of the invention. The invention is capable of other embodiments and of being practiced and carried out in various ways. The invention is not limited in its application to the details of the construction and to the arrangement of the components set forth in the above description or as illustrated in the drawings.

What is claimed is:

1. A system for providing game information to a player, the game being associated with an independent event having a plurality of participants, comprising:

a display device configured to display the event, the event having an end, the participants in the event having a final ranking associated with the end of the event;

a random indicia generator configured to randomly generate a plurality of randomly generated indicia;

a processor in communication with the random indicia generator and the display device, the processor configured to:

generate a player entry for the game, comprising associating a predetermined number of the participants in the independent event to the player as a function of at least one of the plurality of randomly generated indicia and associating each of the randomly generated indicia with a respective participant in an order in which the randomly generated indicia are generated, the randomly generated indicia being configured to remain associated with the respective participants as the participants' rankings change during the event; and, lock wagering on the game at a predetermined stage to prevent further wagering, after wagering is locked, the processor being further configured to:

wait until the final ranking for the event has been established, superimpose, on the display device, the randomly generated indicia on the participants by a superimposer program, compare the participants associated with the player with the final rankings, and establish an outcome of the game based on the comparison.

2. A system, as set forth in claim 1, wherein the processor is further configured to award a prize to the player if the outcome of the game includes a winning condition.

3. A system of claim 1, wherein the processor is further configured to determine the final ranking and to determine an order of the randomly generated indicia as a function of the final ranking, wherein the prize is based on a comparison of an order of the player indicia and the order of the randomly generated indicia.

4. A system of claim 1, further comprising a computer configured to provide the plurality of player indicia to the player.

5. A system of claim 1, further comprising a computer configured to determine whether the player won a prize.

6. A system, as set forth in claim 3, wherein the processor is further configured to determine if a winning condition has occurred as a function of the comparison between the player indicia and the randomly generated indicia.

7. A system, as set forth in claim 6, wherein the game controller is further configured to award the player a prize if the winning condition has occurred.

8. A system, as set forth in claim 7, wherein the game controller is further configured to allow other players to make a wager on the game.

9. A system, as set forth in claim 1, wherein the event is one of a singing contest, a game show, a reality show, an award show, a beauty pageant, and a tennis competition, a soccer competition, a racing competition and any other sports competition.

* * * * *